W. BARK.
PIPE STRAIGHTENING ROLLS.
APPLICATION FILED JULY 31, 1908.

978,813.

Patented Dec. 13, 1910.

WITNESSES
W. W. Swartz
R. A. Balderson

INVENTOR
Wm Bark,
by Bakewell, Byrnes & Parmelee,
his Attys.

UNITED STATES PATENT OFFICE.

WILLIAM BARK, OF ELYRIA, OHIO, ASSIGNOR TO NATIONAL TUBE COMPANY, OF PITTSBURG, PENNSYLVANIA, A CORPORATION OF NEW JERSEY.

PIPE-STRAIGHTENING ROLLS.

978,813.     Specification of Letters Patent.     Patented Dec. 13, 1910.

Application filed July 31, 1908. Serial No. 446,283.

*To all whom it may concern:*

Be it known that I, WILLIAM BARK, of Elyria, Lorain county, Ohio, have invented a new and useful Improvement in Pipe-Straightening Rolls, of which the following is a full, clear, and exact description, reference being had to the accompanying drawings, forming part of this specification, in which—

Figure 1:
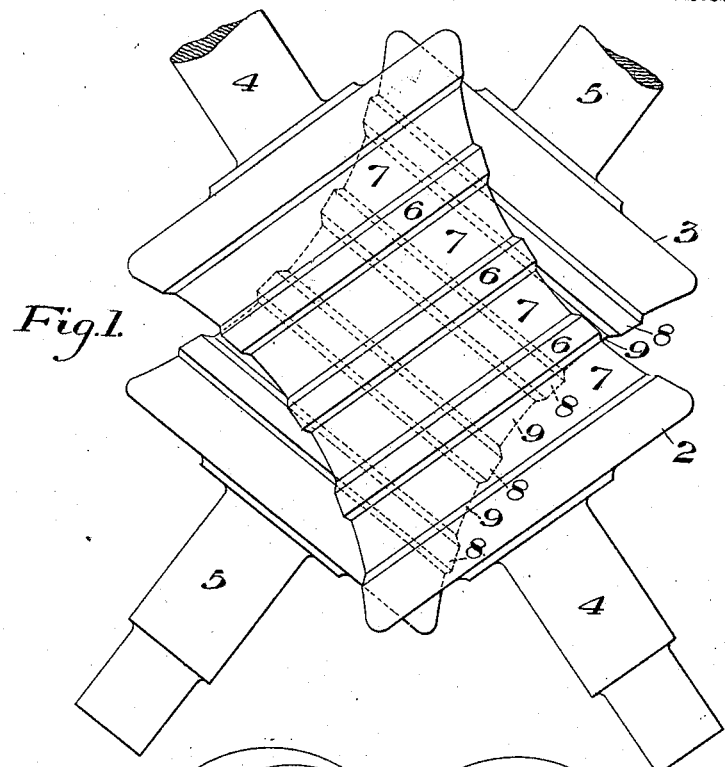
Figure 2:
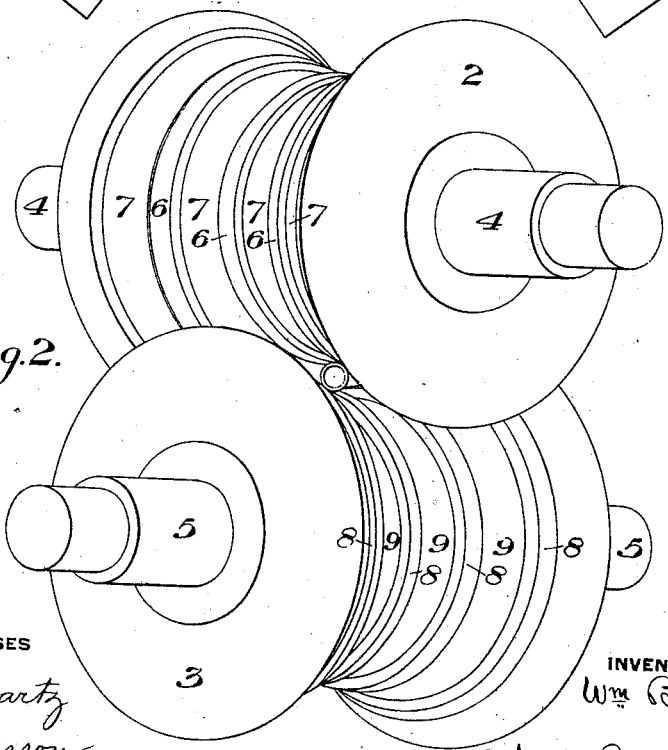

Figure 1 is a plan view of a pair of cross rolls constructed and assembled in position in accordance with my invention; Fig. 2 is an elevation of the same taken in a plane transversely to the line of feed for the pipes while being straightened.

My invention relates to cross rolls for straightening tubes or pipes and the object of the invention is to provide an improved form of straightening roll by the use of which all kinks and bends in the pipe will be removed without injury to the pipe or its weld.

The invention consists in providing straightening rolls of such shape that when set at the proper angle to each other, the points of contact between the pipe or tube and the rolls will be in the form of a spiral and the contacting points on the collars or projections on one roll will be on the opposite side of the pipe but not in the same plane with the points of contact on the collars provided on the opposing roll.

In the drawings, 2 and 3 represent concaved cross rolls which are assembled together at the proper angle to each other to straighten the pipes when placed between them and to feed the pipe forwardly in a horizontal plane midway between the plane of the horizontal axes of the opposing rolls. Each of the rolls 2 and 3 is provided with necks 4 and 5, by which the rolls are secured in adjustable bearings carried in suitable housings. The ends of the necks 4 and 5 on the rolls 2 and 3 are squared or are provided with wabblers by which the rolls are connected through coupling boxes and spindles to a driving motor which is employed to positively rotate such rolls.

The roll housings, bearings and driving connections, not forming part of my invention, are not illustrated, as any of the well known forms of such apparatus may be employed in connection with my improved rolls.

The roll 2 is shaped so that when it is set at a proper angle, the points of contact between the roll and the cylindrical pipe will be in a spiral line and the surface of the roll 2 is provided with circumferential projections or collars 6, which alternate lengthwise across the face of the roll with depressions 7. The roll 3 is arranged to contact with the pipe in a spiral line and is also provided with collars 8 which alternate with depressions 9 on the face of the bottom roll 3. The collars or projections 6 on the roll 2 are arranged to bring the points on the projections which are in contact with the pipe so as to come opposite one of the grooves or recesses 9, in the face of the roll 3, while the points contacting with the pipe on the collars 8 of the roll 3 are arranged to come opposite to the recesses or grooves 7, which are in the face of the roll 2. Preferably, the width of the grooves or recesses 7 and 9 is wider than that of the projections or collars which separate these recesses, although the recesses and collars may be of the same width, when so desired.

In the operation of my improved apparatus, the rolls are assembled with relation to each other with their axes at the proper angle and are positively driven in the usual manner. The pipe to be straightened is fed into the pass formed between these rolls, as is the usual practice, the rotation of the rolls by contact with the pipe between them causing the pipe to rotate and at the same time to be fed forwardly longitudinally in the same manner as has been the case with the plane-faced rolls which have been heretofore used for straightening pipes or tubes.

By reason of the groove in the face of one roll being opposite contacting points on the projections on the opposite roll, the pipe is bent alternately in opposite directions on the same side of the axis of the pipe and by this means operates to effectively remove all kinks or bends in the pipes without injury to the pipes or causing any breaks in the weld of such pipes. The rolls can be adjusted so as to bring sufficient pressure upon the pipe when it is passed between the rolls to remove any imperfections on the surface of the pipe, such as kinks or bends, and deliver truly cylindrical and straight pipes from the rolls.

The advantage of my invention will be apparent to those skilled in the art. By providing grooved faces on the rolls, the pipe is subjected to bending alternately in opposite directions about the axis of the pipe, instead of as heretofore having a single line contact between each roll and the pipe which tends to smooth up the surface of the pipe by lessening any projections on the pipe, as is the case with the plane-faced rolls. The rolls can be manufactured more easily and cheaply than the plane-faced rolls, which must be very accurately turned to the proper curvature. The rolls may be applied to existing apparatus, the only change being in the construction of the faces of the rolls.

Modifications in the construction and arrangement of the rolls may be made without departing from my invention.

The width and depth of the grooves and collars on the face of the rolls may be varied as is desired, the number of grooves and the width of the grooves relative to the width of the projections may also be changed without departing from my invention.

I claim:

1. Pipe straightening rolls having their axes extending at opposite angles to the axis of the pipe being straightened, each roll having a plurality of concentric collars forming separated points of contact with the pipe, the points of contact on one roll being opposite the space between the collars on the opposing roll; substantially as described.

2. Pipe straightening rolls having their axes extending at opposite angles to the pipe being straightened and having alternate peripheral projections and depressions in the faces thereof, the projections being arranged to contact with the pipe at points intersecting a spiral line on the surface of the pipe, and the points on one roll contacting with the pipe being straightened being opposite depressions on the surface of the opposing roll; substantially as described.

In testimony whereof, I have hereunto set my hand.

WILLIAM BARK.

Witnesses:
FRANK M. NOXON, Jr.,
J. EDGAR SIMPSON.